(12) United States Patent
Suzuki et al.

(10) Patent No.: US 11,011,161 B2
(45) Date of Patent: May 18, 2021

(54) RNNLM-BASED GENERATION OF TEMPLATES FOR CLASS-BASED TEXT GENERATION

(71) Applicant: INTERNATIONAL BUSINESS MACHINES CORPORATION, Armonk, NY (US)

(72) Inventors: Masayuki Suzuki, Tokyo (JP); Toru Nagano, Tokyo (JP); Nobuyasu Itoh, Kanagawa (JP); Gakuto Kurata, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 127 days.

(21) Appl. No.: 16/214,523

(22) Filed: Dec. 10, 2018

(65) Prior Publication Data
US 2020/0184960 A1 Jun. 11, 2020

(51) Int. Cl.
*G10L 15/197* (2013.01)
*G06N 3/04* (2006.01)
*G06N 3/08* (2006.01)
*G10L 15/16* (2006.01)

(52) U.S. Cl.
CPC .............. *G10L 15/197* (2013.01); *G06N 3/04* (2013.01); *G06N 3/084* (2013.01); *G10L 15/16* (2013.01)

(58) Field of Classification Search
CPC .......... G06N 3/084; G06N 3/04; G10L 15/16; G10L 15/197
USPC ......................................................... 704/257
See application file for complete search history.

(56) References Cited

U.S. PATENT DOCUMENTS

| | | | |
|---|---|---|---|
| 2014/0236578 A1* | 8/2014 | Malon | G06F 40/40 704/9 |
| 2017/0076725 A1* | 3/2017 | Kumar | G10L 15/32 |
| 2017/0150235 A1 | 5/2017 | Mei et al. | |
| 2017/0187747 A1* | 6/2017 | Huston, III | H04L 63/1441 |
| 2017/0221474 A1* | 8/2017 | Hori | G10L 15/08 |

(Continued)

FOREIGN PATENT DOCUMENTS

CN 107133224 9/2017

OTHER PUBLICATIONS

Zhou et al., "Context-aware Natural Language Generation for Spoken Dialogue Systems", Proceedings of Coling 2016, the 26th International Conference on Computational Linguistics: Technical Papers, pp. 2032-2041, Dec. 2016.

(Continued)

*Primary Examiner* — Quynh H Nguyen
(74) *Attorney, Agent, or Firm* — Tutunjian & Bitetto, P.C.; Randall Bluestone

(57) ABSTRACT

A computer-implemented method is provided for generating a plurality of templates. The method includes obtaining, by a processor device, a Recurrent Neural Network Language Model (RNNLM) trained using a first set of text data. The method further includes adapting, by the processor device, the RNNLM using a second set of text data by adding a new node corresponding to a class in both an input layer and an output layer of the RNNLM, the class being obtained from the second set of text data. The method also includes generating, by the processor device, the plurality of templates using the adapted RNNLM.

16 Claims, 8 Drawing Sheets

(56) References Cited

U.S. PATENT DOCUMENTS

2019/0251165 A1* 8/2019 Bachrach ................ G06F 40/30

OTHER PUBLICATIONS

Shi et al., "RNN Language Model EURASIP Journal on Audio, Speech, and Music Processing 2013, 2013:22ith Word Clustering and Class-Based Output Layer", 8 pages Jan. 2013.

* cited by examiner

RNNLM-BASED GENERATION OF TEMPLATES FOR CLASS-BASED TEXT GENERATION

BACKGROUND

Technical Field

The present invention generally relates to machine learning, and more particularly to Recurrent Neural Network Language Model (RNNLM)-based generation of templates for class-based text generation.

Description of the Related Art

At times, there is a need to customize a language model with a small amount of text data. In class-based text generation, word lists of classes are created, and then templates are created using the classes in order to generate large amounts of text. For example, the following word lists of classes can be created (where classes are shown using italicized font): e.g. FirstName: Sam, Bob . . . City: New York, Tokyo . . . . Moreover, as an example, a template can be created as follows: Hi I'm FirstName from City.

However, the amount of templates is usually limited. Accordingly, templates have to be used repeatedly to generate large amount of texts. Thus, there is a need for a more efficient way to generate templates for class-based text generation.

SUMMARY

According to an aspect of the present invention, a computer-implemented method is provided for generating a plurality of templates. The method includes obtaining, by a processor device, a Recurrent Neural Network Language Model (RNNLM) trained using a first set of text data. The method further includes adapting, by the processor device, the RNNLM using a second set of text data by adding a new node corresponding to a class in both an input layer and an output layer of the RNNLM, the class being obtained from the second set of text data. The method also includes generating, by the processor device, the plurality of templates using the adapted RNNLM.

According to another aspect of the present invention, a computer program product is provided for generating a plurality of templates. The computer program product includes a non-transitory computer readable storage medium having program instructions embodied therewith. The program instructions are executable by a computer to cause the computer to perform a method. The method includes obtaining, by a processor device of the computer, a Recurrent Neural Network Language Model (RNNLM) trained using a first set of text data. The method further includes adapting, by the processor device, the RNNLM using a second set of text data by adding a new node corresponding to a class in both an input layer and an output layer of the RNNLM, the class being obtained from the second set of text data. The method also includes generating, by the processor device, the plurality of templates using the adapted RNNLM.

According to yet another aspect of the present invention, a computer processing system is provided for generating a plurality of templates. The computer processing system includes a memory for storing program code. The computer processing system further includes a processor for running the program code to obtain a Recurrent Neural Network Language Model (RNNLM) trained using a first set of text data. The processor further runs the program code to adapt the RNNLM using a second set of text data by adding a new node corresponding to a class in both an input layer and an output layer of the RNNLM, the class being obtained from the second set of text data. The processor also runs the program code to generate the plurality of templates using the adapted RNNLM.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to Recurrent Neural Network Language Model (RNNLM)-based generation of templates for class-based text generation.

The use of RNNLMs allows for effective processing of sequences and patterns with arbitrary length, as RNNLMs can learn to store past information in the hidden layers.

In an embodiment, the present invention involves training a standard RNNLM using available text data, adapting the RNNLM using a limited amount of template data, generating a large amount of templates using the adapted RNNLM, and generating text using the templates. Regarding the adapting, classes are encoded as specific words. Further regarding the adapting, since a standard RNNLM does not have these specific words, nodes have to be added that correspond to these words in the input/output layers of the RNNLM.

In an embodiment, the present invention is used to train one or more language models for applications that can include, but are not limited to, speech recognition, machine translation, optical character recognition, handwriting recognition, and so forth.

Figure 1:
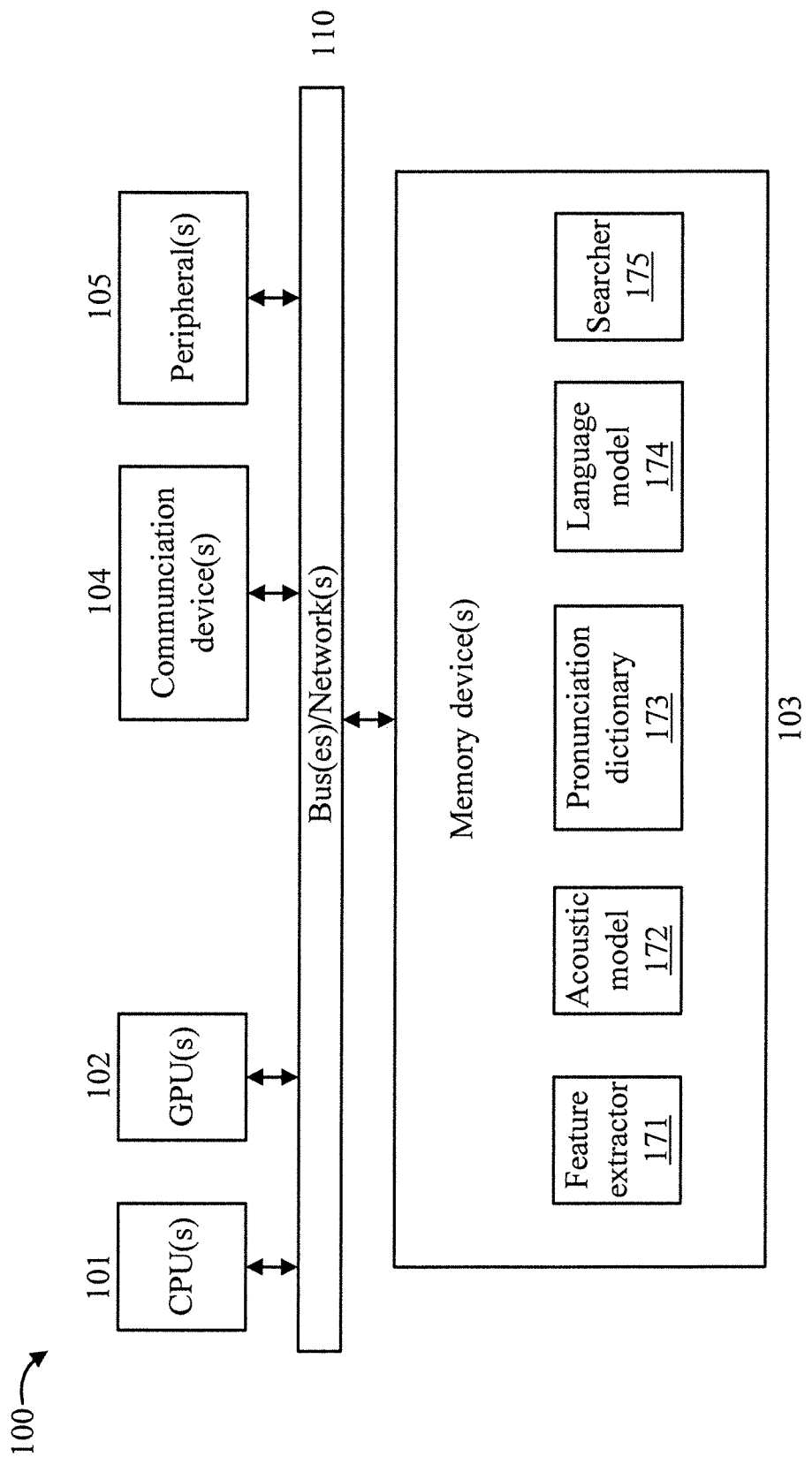
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention.

The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device(s), a printer, a microphone (for receiving acoustic utterances), a speaker(s), an imaging device, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 7-8). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

In an embodiment, processing system 100 can be specially programmed to implement Automatic Speech Recognition (ASR) system, a machine translation system, an optical character recognition system, and/or a handwriting recognition system. In an embodiment, processing system 100 implements an ASR system for transforming acoustic utterances by speakers into textual representations of the acoustic utterances. The speech recognition can relate, but is not limited to, customer service, voice dialing, machine control, data searching, data entry, system/facility/entity access, and so forth. To that end, the processing system 100 can include, in its memory elements, a feature extractor 171, an acoustic model 172, a pronunciation dictionary 173, a searcher 175, and a language model 174 trained using the present invention. The searcher 175 performs a search using inputs provided from the feature extractor 171, the acoustic model 172, the pronunciation dictionary 173, and the language model 174 to output one or more words representative of a decoded acoustic utterance. While mentioned in singular form, the feature extractor, the acoustic model, the pronunciation dictionary, and the language model can each include more than one element. For example, the acoustic model can include multiple acoustic models, at least two being of a different type. A further description of at least some of these elements is provided hereinbelow. Of course, it is to be appreciated that the present invention can be used with other types of specialized systems that involve language models given the teachings of the present invention provided herein, while maintaining the spirit of the present invention.

A further description will now be given of a speech recognition system implemented by processing system 100, in accordance with an embodiment of the present invention.

In a word recognition task, given an acoustic signal corresponding to a sequence of words $X=x1, x2, \ldots, xn$, the feature extractor 171 first generates a compact representation of the input as sequence of feature vectors $Y=y1, y2, \ldots, yt$. Some exemplary features that can be extracted by the feature extractor 171 include, but are not limited to, signal energy, pitch, zero crossing rate, and so forth. It is to be appreciated that the preceding features are merely illustrative and, thus, other features can also be extracted in accordance with the teachings of the present principles, while maintaining the spirit of the present principles.

The acoustic model 172, the pronunciation dictionary 173, and the language model 174 are then used by the searcher 175 to find the most probable word sequence X given these feature vectors. This is done by expressing the desired probability $p(X|Y)$ using Bayes theorem as follows:

$$\hat{X} = \arg\max_X p^{(X|Y)} = \arg\max_X \frac{p(Y|X)p(X)}{p(Y)}$$

where p(X) is the a priori probability of observing a sequence of words in the language, independent of any acoustic evidence and is modeled using the language model component. p(X) corresponds to the likelihood of the acoustic features Y being generated given the word sequence X.

The language model 174 and the acoustic model 172 can be stochastic models trained using large amounts training data. Hidden Markov Models (HMMs) or a hybrid combination of neural networks and HMMs can be used to implement acoustic model 172.

For large vocabulary speech recognition, not all words have an adequate number of acoustic examples in the training data. The acoustic data also covers only a limited vocabulary of words. Instead of modeling incorrect probability distributions of entire words or utterances using limited examples, the acoustic model 172 is built for basic speech sounds. By using these basic units, the system 100 can also recognize words without acoustic training examples. It is to be appreciated that the basic speech sounds can be context independent phones or context dependent phones or any other such speech sounds.

To compute the likelihood p (Y|X), each word in the hypothesized word sequence X is first broken down into its constituent phones using the pronunciation dictionary 173. A single composite acoustic model for the hypothesis is constructed by combining individual phone HMMs. In practice, to account for the large variability of basic speech sounds, HMMs of context dependent speech units with continuous density output distributions can be used. There exist efficient algorithms like the Baum-Welch algorithm to learn the parameters of the acoustic model from training data. Neural network based acoustic models can be used instead of, or in addition to, HMM-GMM based models.

The language model 174 generates the a priori probability p(x). The language model 174 can be an N-gram based language model(s), where typically bi-grams or tri-grams are used. Although p(x) is the probability of a sequence of words, N-grams model this probability assuming the probability of any word xi depends on only N−1 preceding words. These probability distributions are estimated from simple frequency counts that can be directly obtained from large amounts of text. To account for the inability to estimate counts for all possible N-gram sequences, techniques like discounting and back-off are used. The language model 174 can be, but is not limited to, a Recurrent Neural Network based language model as described herein.

Figure 2:
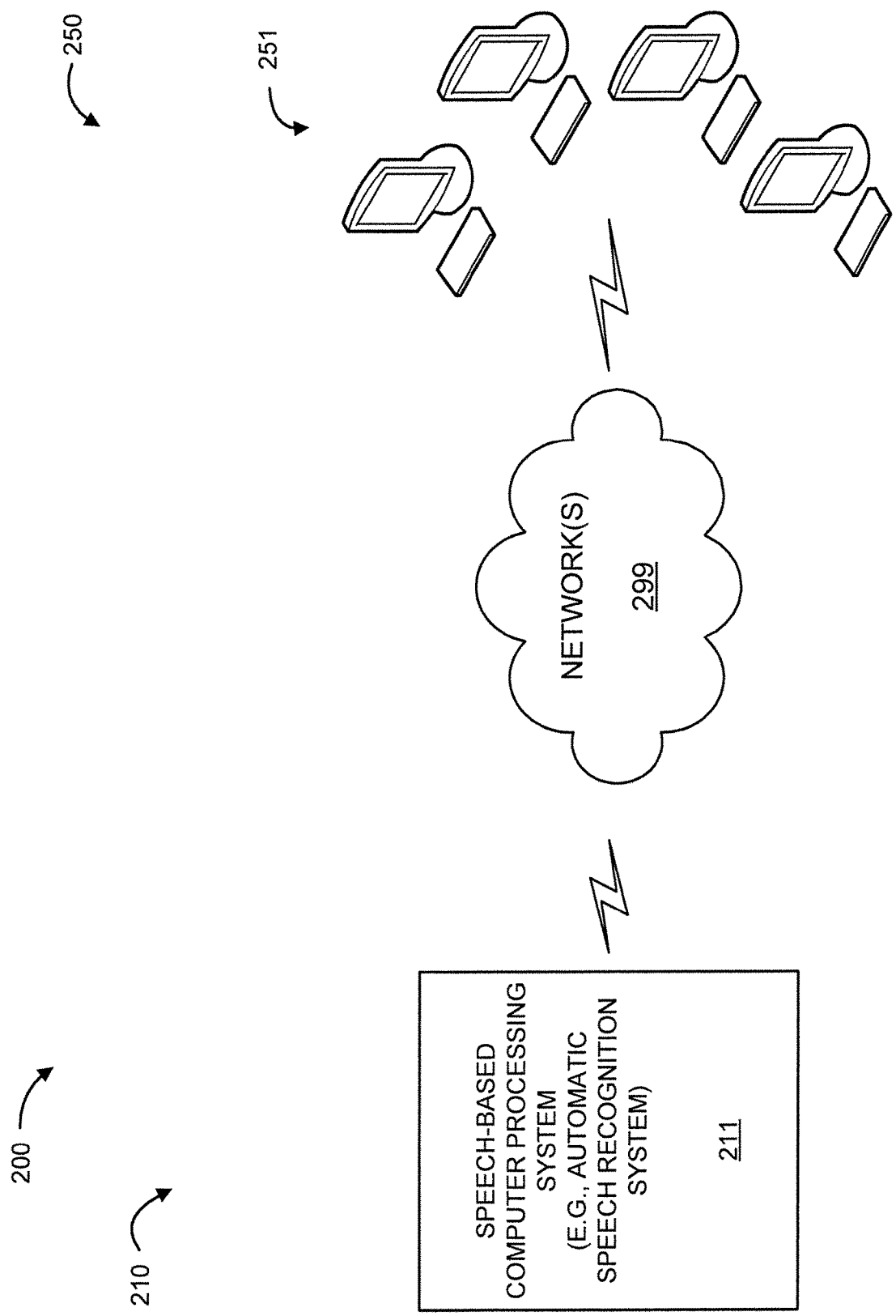
FIG. 2 shows an exemplary operating environment to which the present principles can be applied, in accordance with an embodiment of the present principles.

FIG. 2 shows an exemplary operating environment 200 to which the present principles can be applied, in accordance with an embodiment of the present principles.

The environment 200 involves a server side 210 and a client side 250.

The server side 210 includes a speech-based computer processing system. For illustrative purposes, the speech-based computer processing system is an Automatic Speech Recognition (ASR) system 211. In an embodiment, ASR system 211 can be implemented as ASR system from FIG. 1. However, it is to be appreciated that block 211 can represent any speech-based computer processing system that involves one or more of the following: speaker identification; speaker verification; speaker diarisation; language identification; keyword spotting; emotion detection; automatic translation; court reporting; hands-free computing; home automation; mobile telephony; and so forth.

The client side 250 includes a set of workstations 251.

Users at the workstations 251 can engage in and/or otherwise use speech recognition sessions. The speech recognition sessions can relate, but are not limited to, customer service, voice dialing, machine control, data searching, data entry, system/facility/entity access, and so forth.

Communications between the server side 210 and the client side 250 are made through one or more networks 299.

Figure 3:
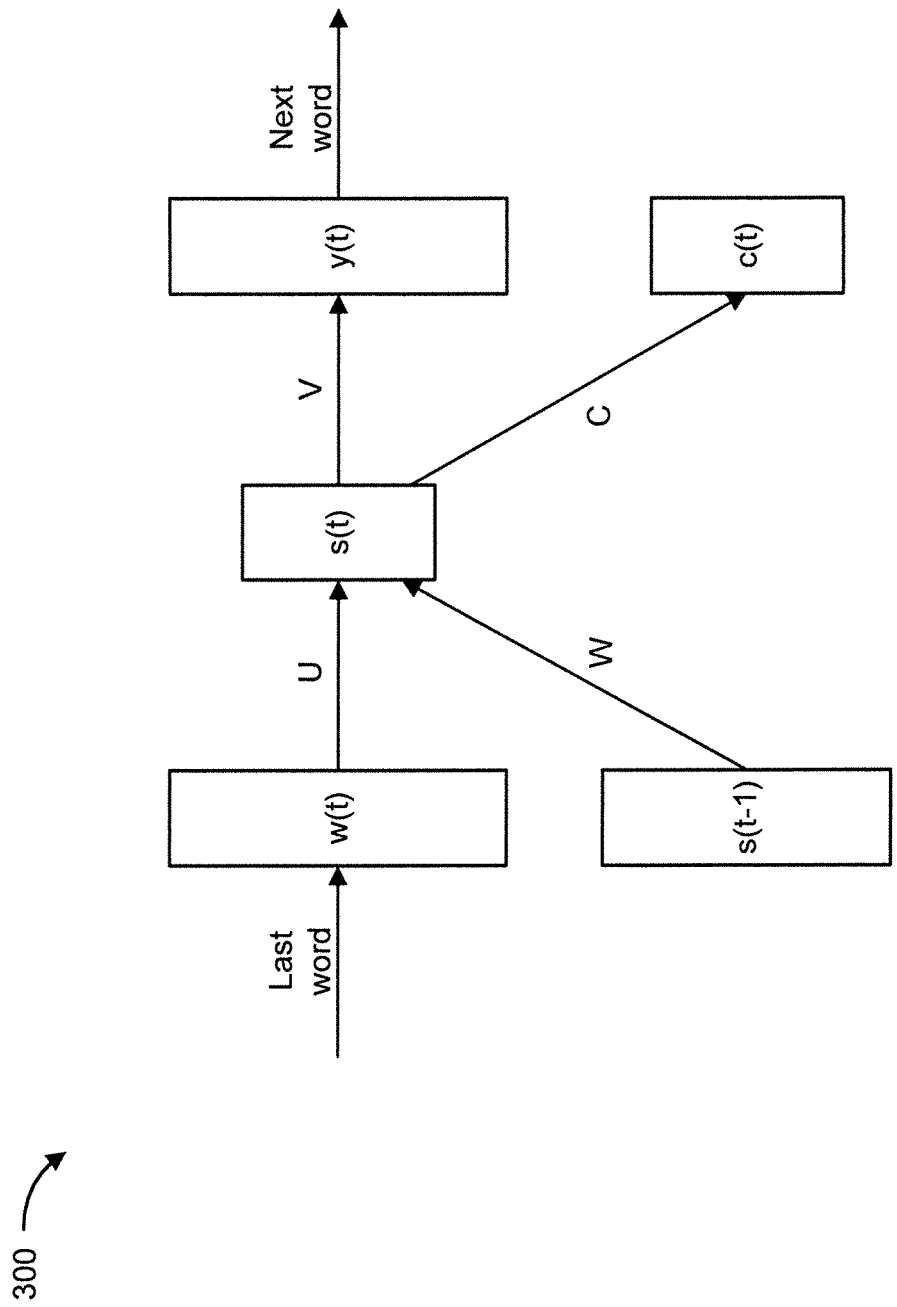
FIG. 3 is a block diagram showing an exemplary Recurrent Neural Network (RNN) architecture to which the present invention can applied, in accordance with an embodiment of the present invention.

FIG. 3 is a block diagram showing an exemplary Recurrent Neural Network (RNN) architecture 300 to which the present invention can applied, in accordance with an embodiment of the present invention. The depicted RNN is usually called an Elman network, or a simple RNN. Of course, other types of RNNs can be used to implement a RNNLM in accordance with the present invention.

The RNN architecture 300 includes an input layer 310, one or more hidden layers 320, and an output layer 330.

The input layer 310 uses the 1-of-N representation of the previous word w(t) concatenated with the previous state of the hidden layers (t−1) 320. The neurons in the hidden layers (t) 320 use a sigmoid activation function. The output layer y(t) 330 has the same dimensionality as w(t), and after the network is trained, it represents the probability distribution of the next word given the previous word and the state of the hidden layer in the previous time step. A class layer 340 c(t) can be optionally used to reduce the computational complexity of the model, at a small cost of accuracy. Training can be performed by the standard stochastic gradient descent algorithm, and the matrix W that represents recurrent weights can be trained, for example, by the backpropagation through time algorithm (BPTT).

Figure 4:
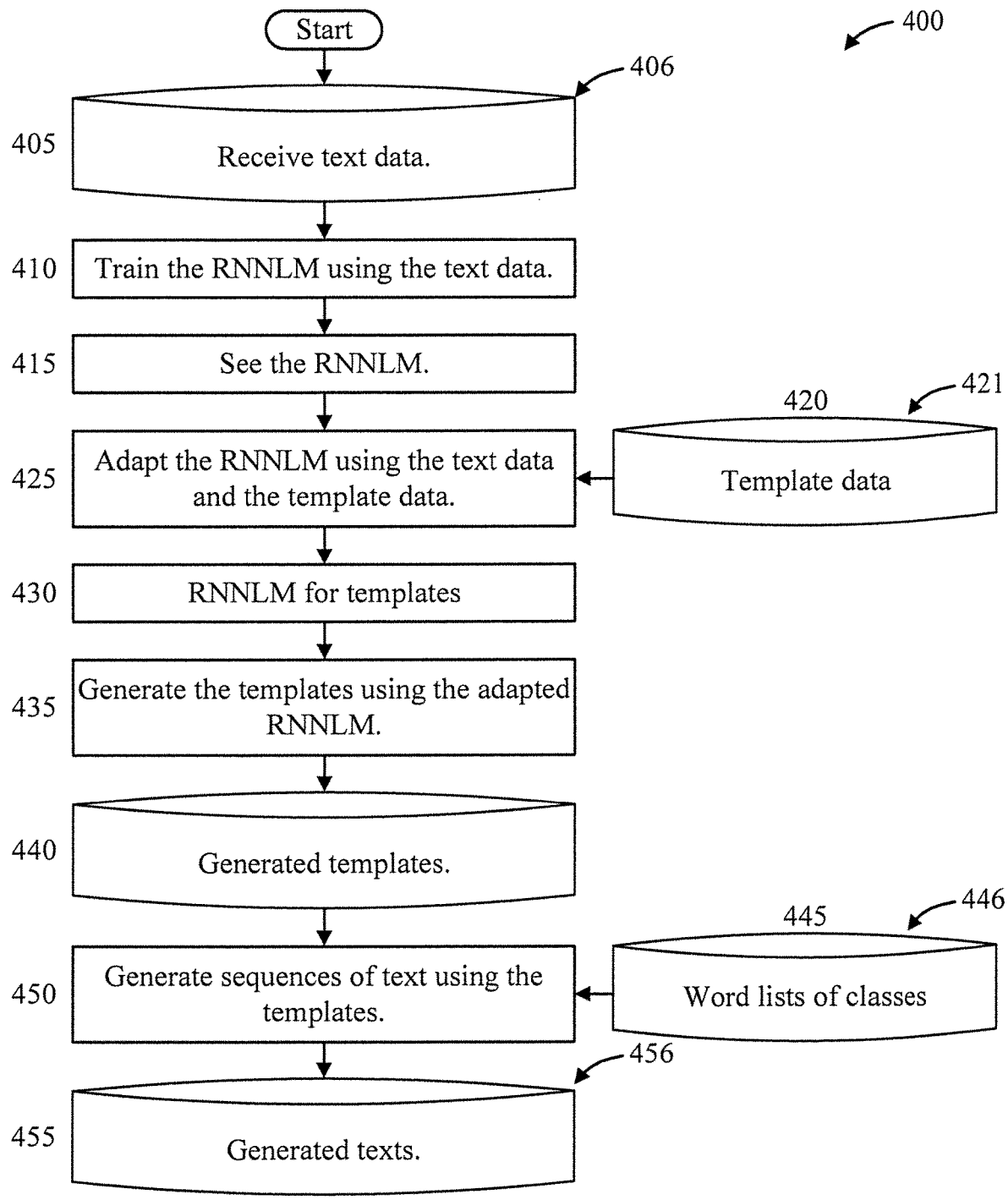
FIG. 4 is a high-level flow/block diagram showing an exemplary method for RNNLM-based generation of templates for class-based text generation, in accordance with an embodiment of the present invention.

FIG. 4 is a high-level flow/block diagram showing an exemplary method 400 for RNNLM-based generation of templates for class-based text generation, in accordance with an embodiment of the present invention.

At block 405, receive text data. The text data is designated for RNNLM training. In an embodiment, the text data is in ASCII text format with a space between words and an end of line character at the end of each sentence. The text data is received from a database 406.

At block 410, train the RNNLM using the text data.
At block 415, seed the RNNLM.
At block 420, receive template data. The template data is received from a template database 421.
At block 425, adapt the RNNLM using the text data and the template data.
At block 430, store the adapted RNNLM for templates.
At block 435, generate the templates using the adapted RNNLM.
At block 440, store the templates. The templates are stored in a template database 440.
At block 445, receive word lists of classes.
At block 450, generate sequences of text using the templates.
At block 455, store the sequences of text. The sequences of text are stored in a text database 456.

Regarding the databases, they all can be included in a single database or in different databases, depending upon the implementation.

A description will now be given regarding block 415 or seeding the RNNLM.

For the seeding, large and in-domain text data is ideal.

If such text data is not available, then we can select texts from various out-of-domain text data sets as follows:
(a) Make a language model for each domain;
(B) Calculate interpolation weights using the EM algorithm so that the entropy of small in-domain text data is the smallest; and
(C) Sample texts using the estimated weights as importance weight.

The "small in-domain text data" can be augmented using standard class-based generation.

Figure 5:
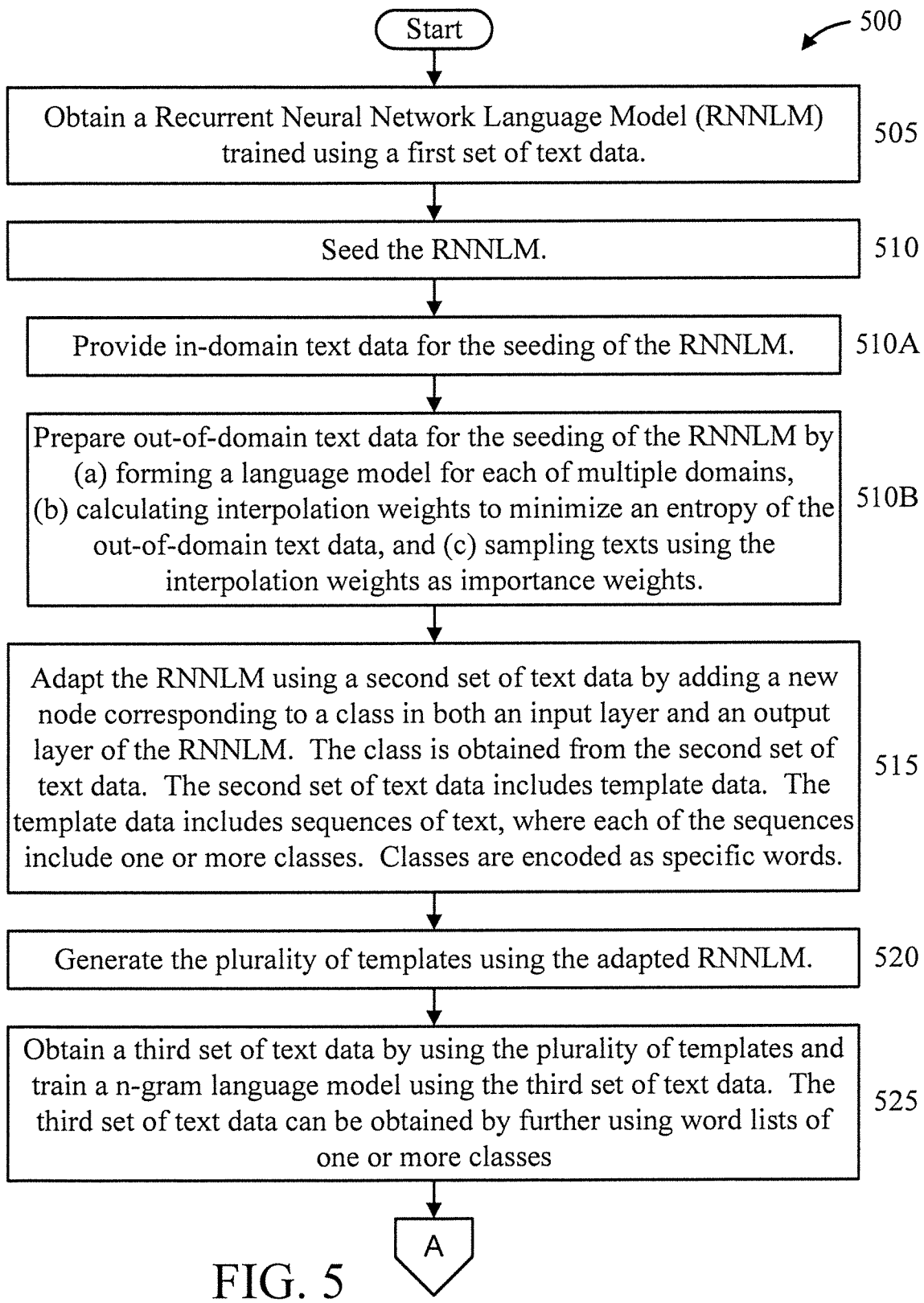
FIGS. 5-6 are flow diagrams showing another exemplary method for RNNLM-based generation of templates for class-based text generation, in accordance with an embodiment of the present invention.
Figure 6:
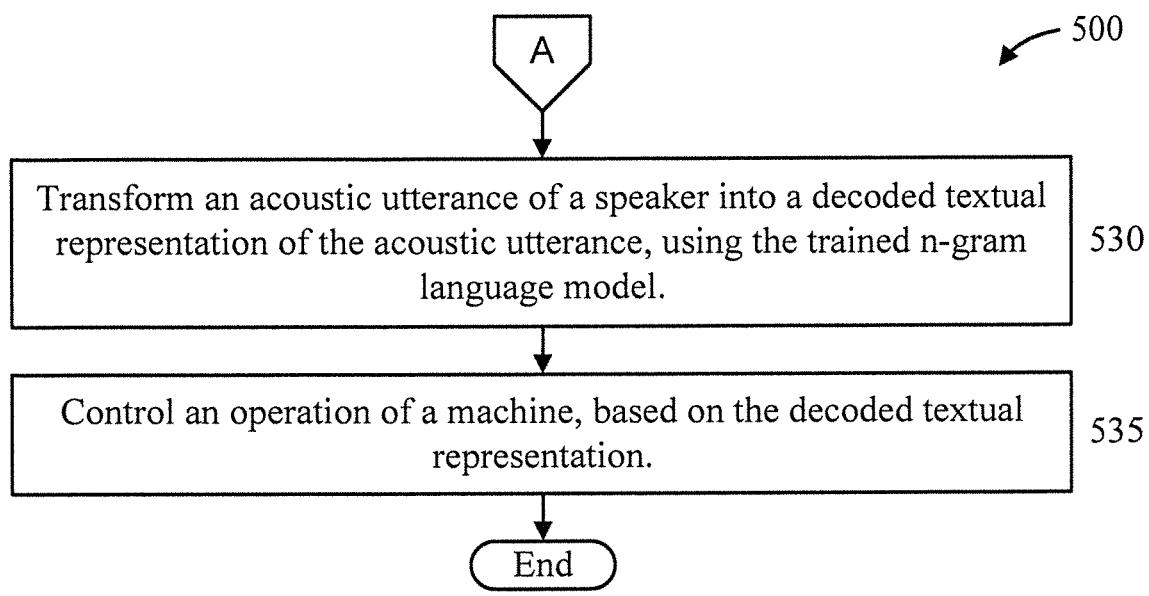

FIGS. 5-6 is a flow diagram showing another exemplary method 500 for RNNLM-based generation of templates for class-based text generation, in accordance with an embodiment of the present invention. Method 500 goes beyond method 500 in being deployed in an Automatic Speech Recognition (ASR) system, and also shows some additional details for some of the common blocks therebetween.

At block 505, obtain a Recurrent Neural Network Language Model (RNNLM) trained using a first set of text data.

At block 510, seed the RNNLM.

In an embodiment, block 510 can include one or more of blocks 510A and 510B.

At block 510A, provide in-domain text data for the seeding of the RNNLM.

At block 510B, prepare out-of-domain text data for the seeding of the RNNLM by (a) forming a language model for each of multiple domains, (b) calculating interpolation weights to minimize an entropy of the out-of-domain text data, and (c) sampling texts using the interpolation weights as importance weights.

At block 515, adapt the RNNLM using a second set of text data by adding a new node corresponding to a class in both an input layer and an output layer of the RNNLM. The class is obtained from the second set of text data. The second set of text data includes template data. The template data includes sequences of text, where each of the sequences include one or more classes. The classes are encoded as specific words. Thus, in an embodiment, the template data includes X words and Y class-words, where X>Y.

At block 520, generate the plurality of templates using the adapted RNNLM.

At block 525, obtain a third set of text data by using the plurality of templates and train a n-gram language model using the third set of text data. The third set of text data can be obtained by further using word lists of one or more classes. It is to be appreciated that block 525 can involve using the templates only one time in order to obtain a large amount of text as the third set of text data, in contrast to conventional approaches which necessarily require having to repeatedly use the templates to generate a large amount of text.

At block 530, transform an acoustic utterance of a speaker into a decoded textual representation of the acoustic utterance, using the trained n-gram language model.

At block 535, control an operation of a machine, based on the decoded textual representation. For example, the acoustic utterance can be a command to turn on a television, turn up or turn down the volume, change the channel up or down, and so forth. Other appliances, systems, or devices can be controlled, as readily appreciated by one of ordinary skill in the art given the teachings of the present invention provided herein.

In an embodiment, in-domain text data is used to seed the RNNLM at block 510 to more specifically tailor the resultant text used to train the language model to a particular machine or system in order to improve recognition results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
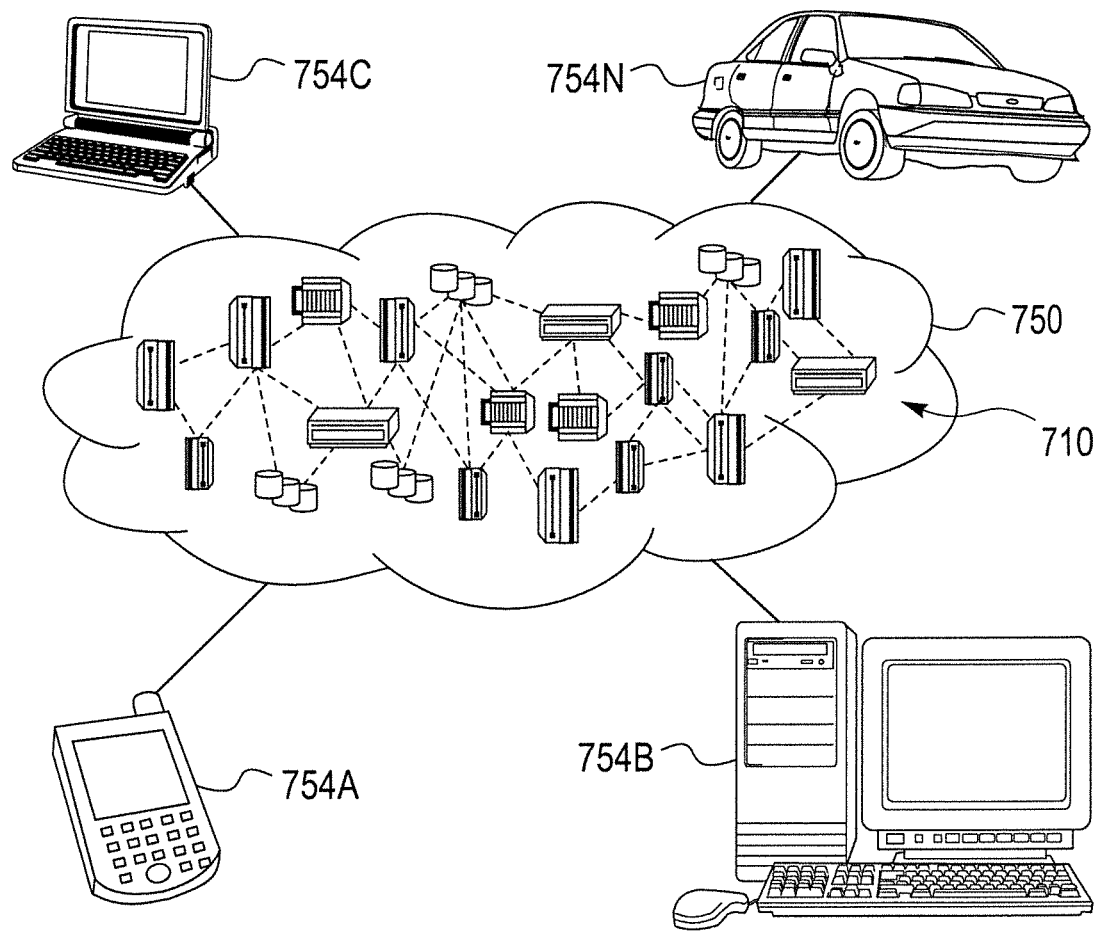
FIG. 7 is a block diagram showing an illustrative cloud computing environment having one or more cloud computing nodes with which local computing devices used by cloud consumers communicate, in accordance with an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
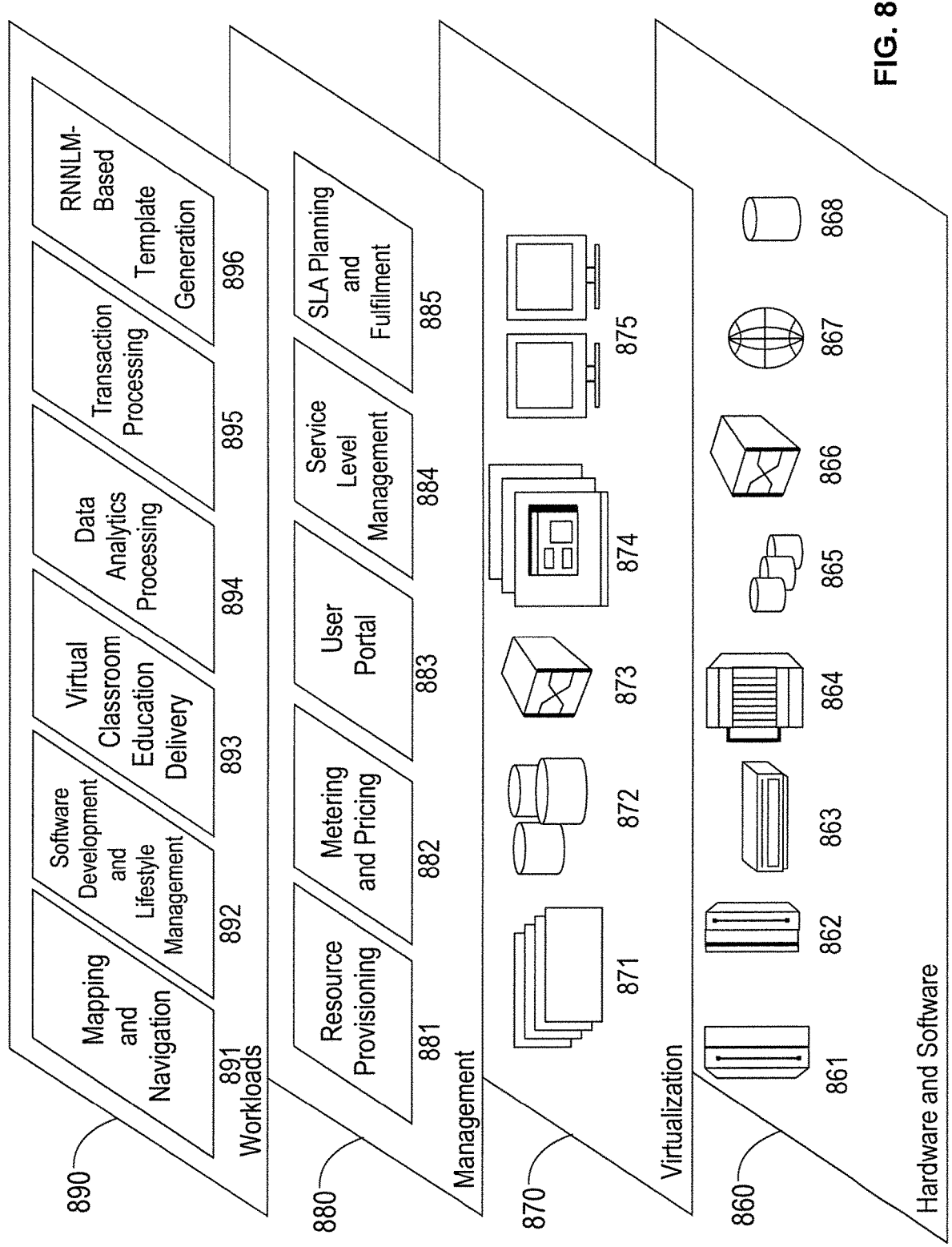
FIG. 8 is a block diagram showing a set of functional abstraction layers provided by a cloud computing environment, in accordance with an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and RNNLM-based generation of templates for class-based text generation 896.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for generating a plurality of templates, comprising:
    obtaining, by a processor device, a Recurrent Neural Network Language Model (RNNLM) trained using a first set of text data;
    adapting, by the processor device, the RNNLM using a second set of text data by adding a new node corresponding to a class in both an input layer and an output layer of the RNNLM, the class being obtained from the second set of text data; and
    generating, by the processor device, the plurality of templates using the adapted RNNLM,
    wherein the method further comprises seeding the RNNLM and preparing out-of-domain text data for said seeding step, wherein said preparing step comprises:
    forming a language model for each of multiple domains;
    calculating interpolation weights to minimize an entropy of the out-of-domain text data; and
    sampling texts using the interpolation weights as importance weights.

2. The computer-implemented method of claim 1, further comprising:
    obtaining a third set of text data by using the plurality of templates; and
    training a n-gram language model using the third set of text data.

3. The computer-implemented method of claim 2, further comprising transforming an acoustic utterance of a speaker into a textual representation of the acoustic utterance, using the trained n-gram language model.

4. The computer-implemented method of claim 2, wherein the third set of text data is obtained by further using word lists of one or more classes.

5. The computer-implemented method of claim 4, wherein the third set of text data is generated for the one or more classes of the word lists.

6. The computer-implemented method of claim 1, wherein the method is performed by an automatic speech recognition system.

7. The computer-implemented method of claim 1, wherein the second set of text data comprises template data.

8. The computer-implemented method of claim 1, wherein said adapting step encodes classes from the second set of data as specific words.

9. A computer program product for generating a plurality of templates, the computer program product comprising a non-transitory computer readable storage medium having program instructions embodied therewith, the program instructions executable by a computer to cause the computer to perform a method comprising:
   obtaining, by a processor device of the computer, a Recurrent Neural Network Language Model (RNNLM) trained using a first set of text data;
   adapting, by the processor device, the RNNLM using a second set of text data by adding a new node corresponding to a class in both an input layer and an output layer of the RNNLM, the class being obtained from the second set of text data; and
   generating, by the processor device, the plurality of templates using the adapted RNNLM
   wherein the method further comprises seeding the RNNLM and preparing out-of-domain text data for said seeding step, wherein said preparing step comprises:
   forming a language model for each of multiple domains;
   calculating interpolation weights to minimize an entropy of the out-of-domain text data; and
   sampling texts using the interpolation weights as importance weights.

10. The computer program product of claim 9, wherein the method further comprises:
   obtaining a third set of text data by using the plurality of templates; and
   training a n-gram language model using the third set of text data.

11. The computer program product of claim 10, wherein the method further comprises transforming an acoustic utterance of a speaker into a textual representation of the acoustic utterance, using the trained n-gram language model.

12. The computer program product of claim 10, wherein the third set of text data is obtained by further using word lists of one or more classes.

13. The computer program product of claim 12, wherein the third set of text data is generated for the one or more classes of the word lists.

14. The computer program product of claim 9, wherein the computer is an automatic speech recognition system.

15. The computer program product of claim 9, wherein the second set of text data comprises template data.

16. A computer processing system for generating a plurality of templates, comprising:
   a memory for storing program code; and
   a processor for running the program code to
      obtain a Recurrent Neural Network Language Model (RNNLM) trained using a first set of text data;
      adapt the RNNLM using a second set of text data by adding a new node corresponding to a class in both an input layer and an output layer of the RNNLM, the class being obtained from the second set of text data; and
      generate the plurality of templates using the adapted RNNLM
   wherein the processor further runs the program code to seed the RNNLM, and prepare out-of-domain text data for seeding by forming a language model for each of multiple domains, calculating interpolation weights to minimize an entropy of the out-of-domain text data, and sampling texts using the interpolation weights as importance weights.

* * * * *